United States Patent
Ueyama et al.

(10) Patent No.: US 9,738,308 B2
(45) Date of Patent: Aug. 22, 2017

(54) ELECTRIC POWER STEERING DEVICE

(71) Applicant: TOYOTA JIDOSHA KABUSHIKI KAISHA, Toyota-shi, Aichi-ken (JP)

(72) Inventors: Masao Ueyama, Mishima (JP); Yoji Kunihiro, Susono (JP); Yoshiaki Suzuki, Sunto-gun (JP); Takahiro Kojo, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/143,764

(22) Filed: May 2, 2016

(65) Prior Publication Data
US 2016/0347359 A1 Dec. 1, 2016

(30) Foreign Application Priority Data

May 29, 2015 (JP) ................................. 2015-109718

(51) Int. Cl.
*B62D 5/04* (2006.01)

(52) U.S. Cl.
CPC ......... *B62D 5/0466* (2013.01); *B62D 5/0463* (2013.01)

(58) Field of Classification Search
CPC .... B62D 5/0463; B62D 5/0466; B62D 5/046; B62D 6/001; B62D 6/008
See application file for complete search history.

(56) References Cited

U.S. PATENT DOCUMENTS 5,076,381 A * 12/1991 Daido .................. B62D 5/0466
180/446
5,668,722 A * 9/1997 Kaufmann ........... B62D 5/0466
180/446

(Continued)

FOREIGN PATENT DOCUMENTS

JP 62198566 A * 9/1987
JP 62-241768 A 10/1987

(Continued)

OTHER PUBLICATIONS

JPO machine translation of JP 62-241768 (original JP document published Oct. 22, 1987).*

(Continued)

*Primary Examiner* — Behrang Badii
*Assistant Examiner* — David Testardi
(74) *Attorney, Agent, or Firm* — Sughrue Mion, PLLC

(57) ABSTRACT

A control device (50) for an electric power steering device (10) is configured to: store a basic target return speed (Vrb), which increases in magnitude as the magnitude of a steering angle (θ) increases; calculate, when a steering wheel (14) is being returned to a neutral position, the basic target return speed (Vrb) based on an actual steering angle (Step 10); calculate a transitional target return speed (Vtrt), which gradually increases in magnitude and gradually approaches the basic target return speed as the magnitude of the actual steering wheel decreases; and control, when the magnitude of a difference between the basic target return speed and the transitional target return speed is more than a reference value, a steering assist torque so that a return speed reaches the transitional target return speed (Step 20 to Step 160).

6 Claims, 9 Drawing Sheets

(56) References Cited

U.S. PATENT DOCUMENTS

| | | | | |
|---|---|---|---|---|
| 6,082,482 | A | * | 7/2000 | Kato .................... B62D 5/0466 180/402 |
| 2008/0114515 | A1 | * | 5/2008 | Hara .................... B62D 5/0466 701/42 |
| 2014/0129089 | A1 | * | 5/2014 | Takeuchi ............. B62D 5/0457 701/41 |
| 2015/0274201 | A1 | | 10/2015 | Kunihiro et al. |
| 2015/0375777 | A1 | * | 12/2015 | Endo .................... B62D 5/0466 701/41 |
| 2016/0347357 | A1 | * | 12/2016 | Kitazume ............ B62D 5/0466 |

FOREIGN PATENT DOCUMENTS

| | | | | | |
|---|---|---|---|---|---|
| JP | 62241768 | A | * | 10/1987 | |
| JP | 10264833 | A | * | 10/1998 | ........... B62D 5/0466 |
| JP | 2002249063 | A | * | 9/2002 | |
| JP | 2006123826 | A | * | 5/2006 | |
| JP | 2006123827 | A | * | 5/2006 | |
| JP | 2006137281 | A | * | 6/2006 | |
| JP | 2006137359 | A | * | 6/2006 | |
| JP | 2007030769 | A | * | 2/2007 | |
| JP | 2007062584 | A | * | 3/2007 | |
| JP | 2008-120343 | A | | 5/2008 | |
| WO | 2014/087546 | A1 | | 6/2014 | |
| WO | WO 2016/017235 | A1 | * | 2/2016 | |

OTHER PUBLICATIONS

JPO machine translation or JP 2006-137281 (original JP document published Jun. 1, 2006).*

* cited by examiner

ELECTRIC POWER STEERING DEVICE

BACKGROUND OF THE INVENTION

1. Field of the Invention

The present invention relates to an electric power steering device to be used for vehicles such as motor vehicles.

2. Description of the Related Art

In an electric power steering device, there is known such control of a return speed that, when a steering wheel is brought into a state of returning toward a neutral position, the steering wheel appropriately returns toward the neutral position even when the self-aligning torque of the steered wheels is low. In this return speed control, a basic target return speed, which is an ideal return speed, is calculated based on a vehicle speed and a steering angle, and a steering assist torque is controlled through feedback control based on a deviation between an actual return speed and the basic target return speed so that the actual return speed reaches the basic target return speed.

The basic target return speed is calculated so as to increase in the magnitude as the magnitude of the steering angle increases. At the beginning of the return speed control, the magnitude of the deviation between the actual return speed and the basic target return speed is large. Thus, the magnitude of a feedback control amount is significantly large, and hunting is often caused in which a state of an excessive actual return speed and a state of an insufficient actual return speed with respect to the basic target return speed are alternately repeated. In order to avoid unnecessary increase/decrease in the return speed due to the hunting, for example, as disclosed in Japanese Patent Application Laid-open No. Sho 62-241768, such a configuration that as the magnitude of the deviation of the return speed increases, a gain of the feedback control is decreased is known.

In the electric power steering device disclosed in Japanese Patent Application Laid-open No. Sho 62-241768, at the beginning of the return speed control, the magnitude of the deviation of the return speed is large. Thus, the gain of the feedback control is decreased, and the magnitude of the feedback control amount does not increase to a large value. Therefore, the magnitude of the actual return speed does not become sufficiently large, and thus a decrease speed of the magnitude of the steering angle is small. Thus, the change in the basic target return speed with respect to the elapsed time is slow, and a state in which the magnitude of the deviation of the return speed is large continues for a long period. Therefore, a state in which the gain of the feedback control is set to a small value also continues for a long period. As a result, the period until the steering wheel returns to the neutral position becomes significantly long. Thus, with the electric power steering device disclosed in Japanese Patent Application Laid-open No. Sho 62-241768, the unnecessary increase/decrease in the return speed due to the hunting can be avoided, but the original purpose of the return speed control, which is to appropriately return the steering wheel toward the neutral position, cannot be attained.

SUMMARY OF THE INVENTION

It is a primary object of the present invention to change, in the return speed control for the electric power steering device, the return speed in synchronization with the basic target return speed as closely as possible and appropriately return the steering wheel toward the neutral position while avoiding the unnecessary increase/decrease in the return speed due to the hunting.

According to one embodiment of the present invention, there is provided an electric power steering device, including: a steering assist torque applying device; and a control device configured to control a steering assist torque to be applied by the steering assist torque applying device to a steering apparatus for a vehicle, in which: the control device includes a storage device configured to store a relationship between a basic target return speed, which increases in magnitude as a magnitude of an actual steering angle increases, and a steering angle, and is configured to calculate, when a steering wheel is being returned toward a neutral position, the basic target return speed based on the actual steering angle and the relationship, and to apply feedback control to the steering assist torque so that a return speed of the steering wheel reaches the calculated basic target return speed.

The control device is configured to calculate, when the steering wheel is being returned toward the neutral position, a transitional target return speed, which gradually increases in magnitude and gradually approaches the basic target return speed as the magnitude of the actual steering angle decreases, and to apply, when a magnitude of a difference between the basic target return speed and the transitional target return speed is more than a reference value, feedback control to the steering assist torque so that the return speed of the steering wheel reaches the transitional target return speed in place of the calculated basic target return speed.

With the above-mentioned configuration, when the steering wheel is being returned toward the neutral position, the transitional target return speed, which gradually increases in magnitude and approaches the basic target return speed as the magnitude of the actual steering angle decreases, is calculated. At the beginning of the return speed control, the magnitude of the difference between the basic target return speed and the transitional target return speed is more than the reference value, and the feedback control is applied to the steering assist torque so that the return speed of the steering wheel reaches the transitional target return speed.

The transitional target return speed is calculated so as to gradually approach the basic target return speed as the magnitude of the actual steering wheel decreases, and thus the magnitude of the transitional target return speed gradually increases as the return speed control progresses. The actual return speed of the steering wheel is controlled so as to reach the transitional target return speed, and thus the magnitude of the actual return speed gradually increases as the return speed control progresses. Thus, the magnitude of the difference between the actual return speed and the transitional target return speed does not increase, and the magnitude of the feedback control amount does not thus excessively increase.

Thus, the unnecessary increase/decrease in the return speed due to the hunting caused by the rapid increase in the return speed of the steering wheel can be avoided. Moreover, the gain of the feedback control does not need to be decreased, and the excessive extension of the period until the steering wheel returns to the neutral position as in the electric power steering device disclosed in Japanese Patent Application Laid-open No. Sho 62-241768 can also be avoided.

Moreover, when the transitional target return speed gradually approaches the basic target return speed, and the magnitude of the difference between the basic target return speed and the transitional target return speed becomes equal to or less than the reference value, the return speed of the steering wheel is controlled so as to reach the basic target return speed. Thus, the return speed of the steering wheel is controlled to reach the transitional target return speed, which gradually approaches the basic target return speed, and then, to reach the basic target return speed, which is the original target value. Thus, the return speed can be changed in synchronization with the basic target return speed as closely as possible while avoiding the unnecessary increase/decrease in the return speed due to the hunting, thereby appropriately returning the steering wheel toward the neutral position.

Expressions such as "the steering wheel is returned toward the neutral position" and "returns the steering wheel toward the neutral position" herein are not limited to the case in which the target position is the neutral position in the return speed control. In other words, the expressions include, in a case in which the steering wheel is incrementally turned beyond the neutral position toward the opposite direction such as in reciprocating steering, a return of the steering wheel toward the neutral position. Further, the expressions include a case in which the return of the steering wheel is finished before the steering wheel reaches the neutral position such as a case in which when the steering wheel is being returned toward the neutral position, the steering wheel is held or incrementally steered toward the direction opposite to the neutral position.

According to one embodiment of the present invention, the control device is configured to determine whether or not the steering wheel is being returned toward the neutral position by an active return steering by a driver, and to calculate, in a case in which the steering wheel is being returned toward the neutral position by the active return steering by the driver, the transitional target return speed so that the magnitude of the transitional target return speed increases compared with a case in which the steering wheel is being returned toward the neutral position not by the active return steering by the driver.

In general, when the steering wheel is being returned toward the neutral position by the active return steering by the driver, the driver is considered to desire an efficient return of the steering wheel toward the neutral position. Conversely, when the steering wheel is being returned toward the neutral position not by the active return steering by the driver, the driver is considered to desire a moderate return of the steering wheel toward the neutral position.

With the above-mentioned configuration, it is determined whether or not the steering wheel is being returned toward the neutral position by the active return steering by the driver. Further, in the case in which the steering wheel is being returned toward the neutral position by the active return steering by the driver, the transitional target return speed is calculated so that the magnitude increases compared with the case in which the steering wheel is being returned toward the neutral position not by the active return steering by the driver.

Thus, while the steering wheel is being returned toward the neutral position by the active return steering by the driver, the magnitude of the transitional target return speed increases. Thus, the steering wheel can efficiently be returned toward the neutral position by increasing the magnitude of the steering assist torque. In contrast, while the steering wheel is being returned toward the neutral position not by the active return steering by the driver, the magnitude of the transitional target return speed does not increase. Thus, the steering wheel can moderately be returned toward the neutral position by preventing the magnitude of the steering assist torque from being excessively increased.

The determination of whether or not the steering wheel is being returned toward the neutral position by the active return steering by the driver may be made in an arbitrary manner. For example, in International Patent WO2014-087546A filed by the applicant of the subject application, there is described determining which of an active operation, a passive operation, and a holding operation, the driver is carrying out as the steering operation based on a sum of a product of a steering angular velocity and the steering torque, and a product of the steering angle and the derivative of the steering torque.

The "active operation" is an operation in which energy of steering is provided from the driver to a steering apparatus, namely, an operation in which the driver actively carries out the transitional steering, thereby increasing energy of the steering held by the steering apparatus. The "passive operation" is an operation in which energy of steering is provided from the steering apparatus to the driver, namely, an operation in which the energy of the steering held by the steering apparatus is transmitted to the driver, and the driver passively carries out the transitional steering. The "holding operation" is a state in which the energy of the steering is not given/received between the steering apparatus and the driver, namely, a state in which the driver does not carry out the transitional steering, and the potential energy held by the steering apparatus is not changed.

As disclosed in International Patent WO2014-087546A, a steering power based on a product of the steering angular velocity and the steering torque reflects strength of an intention of the driver to change a travel direction of the vehicle under the state in which the driver carries out the transitional steering operation. On the other hand, a steering power based on a product of the steering angle and the derivative of the steering torque reflects strength of an intention of the driver to permit a rotation of the steering wheel rotated by an inverse input from a road surface. Thus, under the state in which the steering wheel is being returned toward the neutral position, when the steering operation is determined to be the active operation based on the sum of the products, the steering wheel may be determined to be being returned toward the neutral position by the active return steering by the driver.

According to another embodiment of the present invention, the control device is configured to: set, at predetermined periods, the calculated basic target return speed to a preliminary target return speed; set, when a magnitude of a difference between the preliminary target return speed and a previous target return speed is more than an increase restriction value, a current target return speed so that a magnitude of the current target return speed is a sum of a magnitude of the previous target return speed and the increase restriction value; set, when the magnitude of the difference between the preliminary target return speed and the previous target return speed is not more than the increase restriction value, the current target return speed to the preliminary target return speed; and apply low-pass filtering to the current target return speed to calculate the transitional target return speed.

With the above-mentioned configuration, the calculated basic target return speed is set to the preliminary target return speed at predetermined periods. When the magnitude of the difference between the preliminary target return speed and the previous target return speed is more than the increase restriction value, the current target return speed is set so that the magnitude of the current target return speed is the sum of the magnitude of the previous target return speed and the increase restriction value. When the magnitude of the difference between the preliminary target return speed and the previous target return speed is not more than the increase restriction value, the current target return speed is set to the preliminary target return speed. Further, the transitional target return speed is calculated by applying the low-pass filtering to the current target return speed.

Thus, by restricting the increase amount of the target return speed at predetermined periods to be equal to or less than the increase restriction value, the increase rate of the magnitude of the transitional target return speed can be prevented from being excessive. Further, the transitional target return speed is calculated by applying the low-pass filtering to the target return speed, and thus, the transitional target return speed can reliably and gradually be caused to approach the basic target return speed.

Further, according to another embodiment of the present invention, the control device is configured to determine whether or not the steering wheel is being returned toward the neutral position by an active return steering by a driver, and to increase, in a case in which the steering wheel is being returned toward the neutral position by the active return steering by the driver, a cutoff frequency for carrying out the low-pass filtering compared with a case in which the steering wheel is being returned toward the neutral position not by the active return steering by the driver.

With the above-mentioned configuration, it is determined whether or not the steering wheel is being returned toward the neutral position by the active return steering by the driver. Further, in the case in which the steering wheel is being returned toward the neutral position by the active return steering by the driver, the cutoff frequency for the low-pass processing is increased compared with the case in which the steering wheel is being returned toward the neutral position not by the active return steering by the driver.

Thus, when the steering wheel is being returned toward the neutral position by the active return steering by the driver, the cutoff frequency increases. Thus, the steering wheel can efficiently be returned toward the neutral position by increasing the magnitude and the increase rate of the transitional target return speed. In contrast, when the steering wheel is being returned toward the neutral position not by the active return steering by the driver, the cutoff frequency does not increase. Thus, the steering wheel can moderately be returned toward the neutral position by preventing the magnitude and the increase rate of the transitional target return speed from being excessive.

Further, according to another embodiment of the present invention, the control device is configured to increase, in a case in which the magnitude of the actual steering angle is small, the increase restriction value compared with a case in which the magnitude of the actual steering angle is large.

With the above-mentioned configuration, under the state in which the magnitude of the actual steering angle is small, and the self-aligning torque of the steered wheels is low, the steering wheel can efficiently be retuned toward the neutral position by increasing the increase restriction value to further increase the magnitude and the increase rate of the transitional target return speed. In contrast, under the state in which the magnitude of the actual steering angle is large, and the self-aligning torque of the steered wheels is high, the unnecessary increase/decrease in the return speed due to the hunting can be avoided by decreasing the increase restriction value to further decrease such a fear that the magnitude and the increase rate of the transitional target return speed excessively increase.

Further, according to another embodiment of the present invention, the control device is configured to determine whether or not the steering wheel is being returned toward the neutral position by an active return steering by a driver, and to increase, in a case in which the steering wheel is being returned toward the neutral position by an active return steering by a driver, the increase restriction value compared with a case in which the steering wheel is being returned toward the neutral position not by the active return steering by the driver.

With the above-mentioned configuration, it is determined whether or not the steering wheel is being returned toward the neutral position by the active return steering by the driver. Further, in the case in which the steering wheel is being returned toward the neutral position by the active return steering by the driver, the increase restriction value is increased compared with the case in which the steering wheel is being returned toward the neutral position not by the active return steering by the driver.

Thus, when the steering wheel is being returned toward the neutral position by the active return steering by the driver, the increase restriction value increases. Thus, the steering wheel can efficiently be returned toward the neutral position by increasing the magnitude and the increase rate of the transitional target return speed. In contrast, when the steering wheel is being returned toward the neutral position not by the active return steering by the driver, the increase restriction value does not increase. Thus, the steering wheel can moderately be returned toward the neutral position by preventing the magnitude and the increase rate of the transitional target return speed from being excessive.

DETAILED DESCRIPTION OF THE PREFERRED EMBODIMENTS

Now, with reference to the accompanying drawings, preferred embodiments of the present invention are described in detail.

First Embodiment

Figure 1:
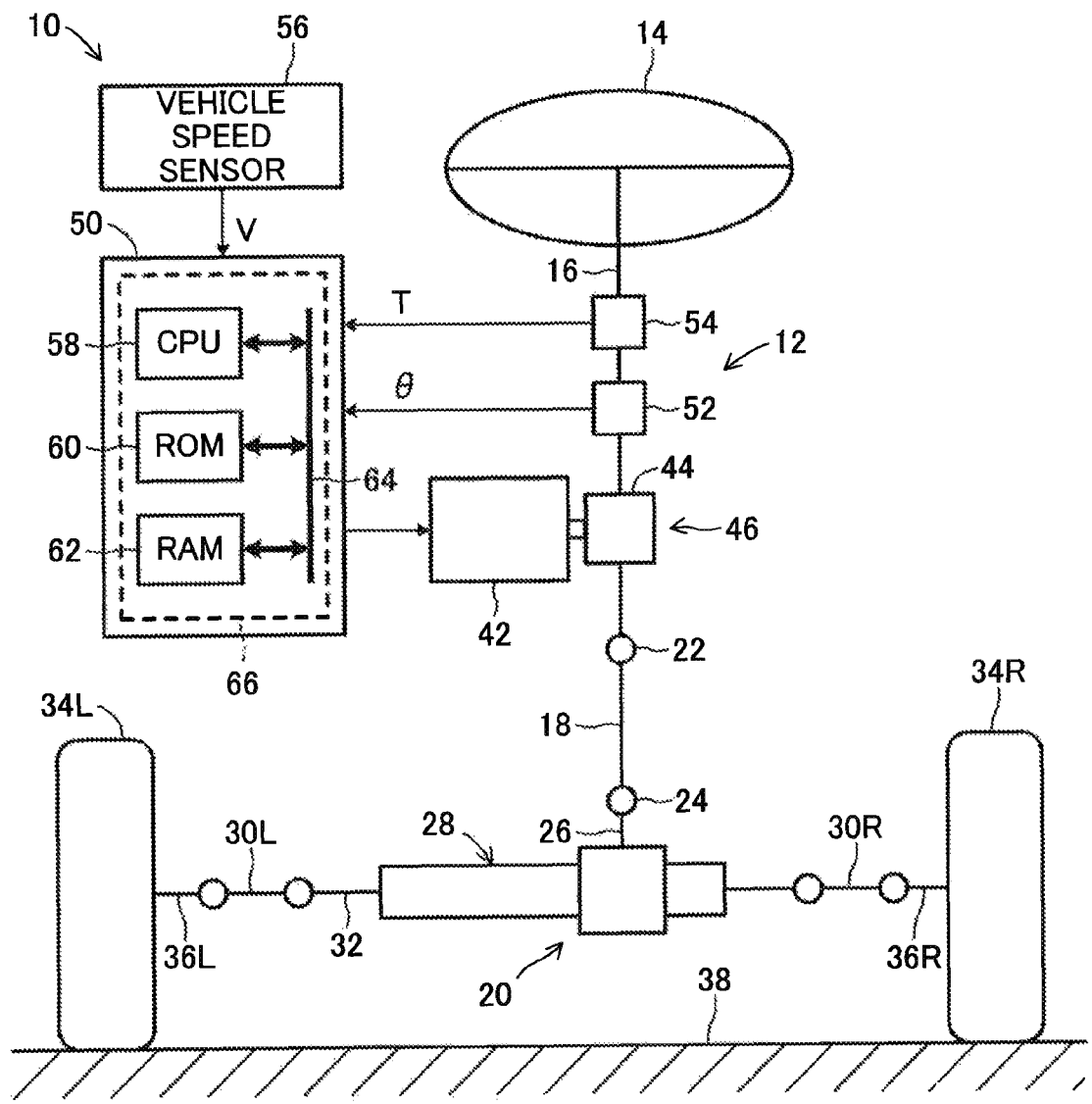
FIG. 1 is an explanatory diagram for illustrating an overview of an electric power steering device according to a first embodiment of the present invention.

FIG. 1 is an explanatory diagram for illustrating an overview of an electric power steering device 10 according to a first embodiment of the present invention. The electric power steering device 10 according to this embodiment is constructed as a column assist type electric power steering device. The electric power steering device according to the present invention may be a power steering device of another type such as a rack assist type electric power steering device with its motor coaxial with a rack as long as a steering assist torque can be controlled.

In FIG. 1, the electric power steering device 10 is applied to a steering apparatus 12. The steering apparatus 12 includes a steering wheel 14 to be operated by a driver, an upper steering shaft 16 configured to rotate along with the steering wheel 14, an intermediate shaft 18, and a steering mechanism 20. The intermediate shaft 18 is coupled to a bottom end of the upper steering shaft 16 at a top end of the intermediate shaft 18 via a universal joint 22, and is coupled to a pinion shaft 26 of the steering mechanism 20 at a bottom end of the intermediate shaft 18 via a universal joint 24.

The steering mechanism 20 includes a rack-and-pinion apparatus 28, and tie rods 30L and 30R. The rack-and-pinion apparatus 28 converts a rotation of the pinion shaft 26 into a translational motion in a vehicle lateral direction of a rack bar 32, and also performs conversion in an opposite direction. The tie rods 30L and 30R are pivotally connected to tips of the rack bar 32 at inner ends of the tie rods 30L and 30R. The tie rods 30L and 30R are pivotally connected, at outer ends of the tie rods 30L and 30R, to knuckle arms 36L and 36R provided to carriers (not shown) for front left and right wheels 34L and 34R.

Thus, the rotational displacement and the rotational torque of the steering wheel 14 are converted by the steering mechanism 20 into pivot displacement and pivot torques about kingpin axes (not shown) of the front wheels 34L and 34R, and then are transmitted to the front wheels 34L and 34R. Moreover, pivot displacement and pivot torques about the kingpin axes received by the front left and right wheels 34L and 34R from a road surface 38 are transmitted by the steering mechanism 20 to the steering wheel 14 as a rotational displacement and a rotational torque, respectively.

The electric power steering device 10 includes a power steering unit 46 including a motor 42 and a conversion device 44. The conversion device 44 includes a worm gear fixed to a rotation shaft of the motor 42, and a worm wheel fixed to the upper steering shaft 16, which are not shown in FIG. 1. A rotational torque of the motor 42 is converted into a rotational torque of the upper steering shaft 16 by the conversion device 44, and is transmitted to the upper steering shaft 16 as the steering assist torque. Thus, the power steering unit 46 is configured to function as a steering assist torque applying device for applying the steering assist torque to the steering apparatus 12.

Moreover, the electric power steering device 10 includes an electronic control device 50. The electronic control device 50 functions as a control device configured to control a steering assist torque by controlling the rotational torque applied by the motor 42 as described in detail later. Signals representing a steering angle θ and a steering torque T are input to the electronic control device 50 respectively from a steering angle sensor 52 and a torque sensor 54 provided to the upper steering shaft 16. Moreover, a signal representing a vehicle speed V is also input to the electronic control device 50 from a vehicle speed sensor 56. Note that, the steering angle sensor 52 and the torque sensor 54 respectively detect the steering angle θ and the steering torque T, which are defined to be positive when the vehicle is steered toward a right turn direction.

The electronic control device 50 includes a microcomputer 66 including a CPU 58, a ROM 60, a RAM 62, and an input/output port device connected to one another via a bidirectional common bus 64. The ROM 60 is configured to function as a storage device configured to store a program for carrying out control for the steering assist torque to be executed in accordance with flowcharts illustrated in FIG. 2 and FIG. 3 described later, maps shown in FIG. 6 to FIG. 8, and the like. The CPU 58 and the RAM 62 are configured to function as a calculation device configured to carry out various calculations for controlling the steering assist torque as detailed later.

Figure 6:
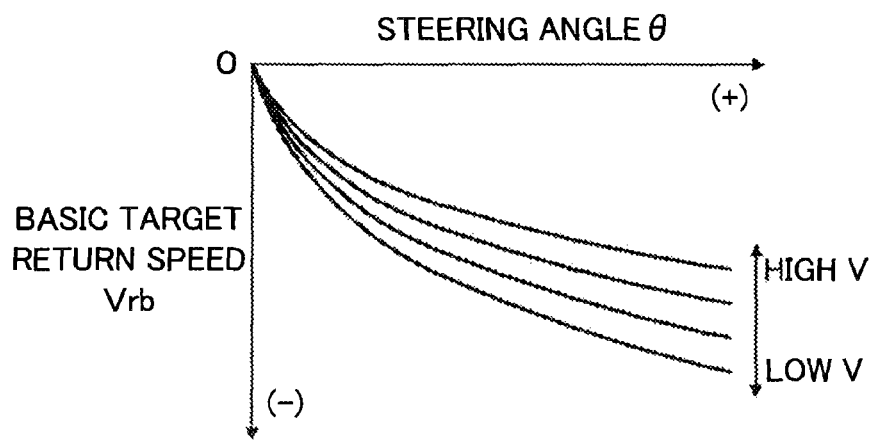
FIG. 6 is a graph for showing a map to be used to calculate a basic target return speed Vrb based on the absolute value of a steering angle θ and a vehicle speed V.

In particular, FIG. 6 is a graph for showing a relationship between the steering angle θ, the vehicle speed V, and a basic target return speed Vrb for a range in which the steering angle θ is equal to or more than 0. A curve representing the basic target return speed Vrb for a range in which the steering angle θ is negative, which is not shown in FIG. 6, is point symmetric to the curve of FIG. 6 with respect to the origin. The basic target return speed Vrb is an ideal return speed when the steering wheel 14 is returned from a position at which the magnitude of the steering angle θ is infinite toward the neutral position, and is determined by specifications of the vehicle. The basic target return speed Vrb is in general a function of the square root of the absolute value of the steering angle θ, and the magnitude of the basic target return speed Vrb increases as the absolute value of the steering angle θ increases, and decreases as the vehicle speed V increases. The return speed such as the basic target return speed Vrb is a rotational angular velocity when the steering wheel 14 returns toward the neutral position.

The electronic control device 50 is configured to, when the steering wheel 14 is being incrementally steered or is being held, control the steering assist torque for the incremental steering or the hold steering. In other words, the electronic control device 50 is configured to calculate a target steering assist torque Tat based on the steering torque T and the vehicle speed V. Further, the electronic control device 50 is configured to control the power steering unit 46 so that a steering assist torque Ta reaches the target steering assist torque Tat, thereby decreasing a steering load imposed on the driver.

Figure 2:
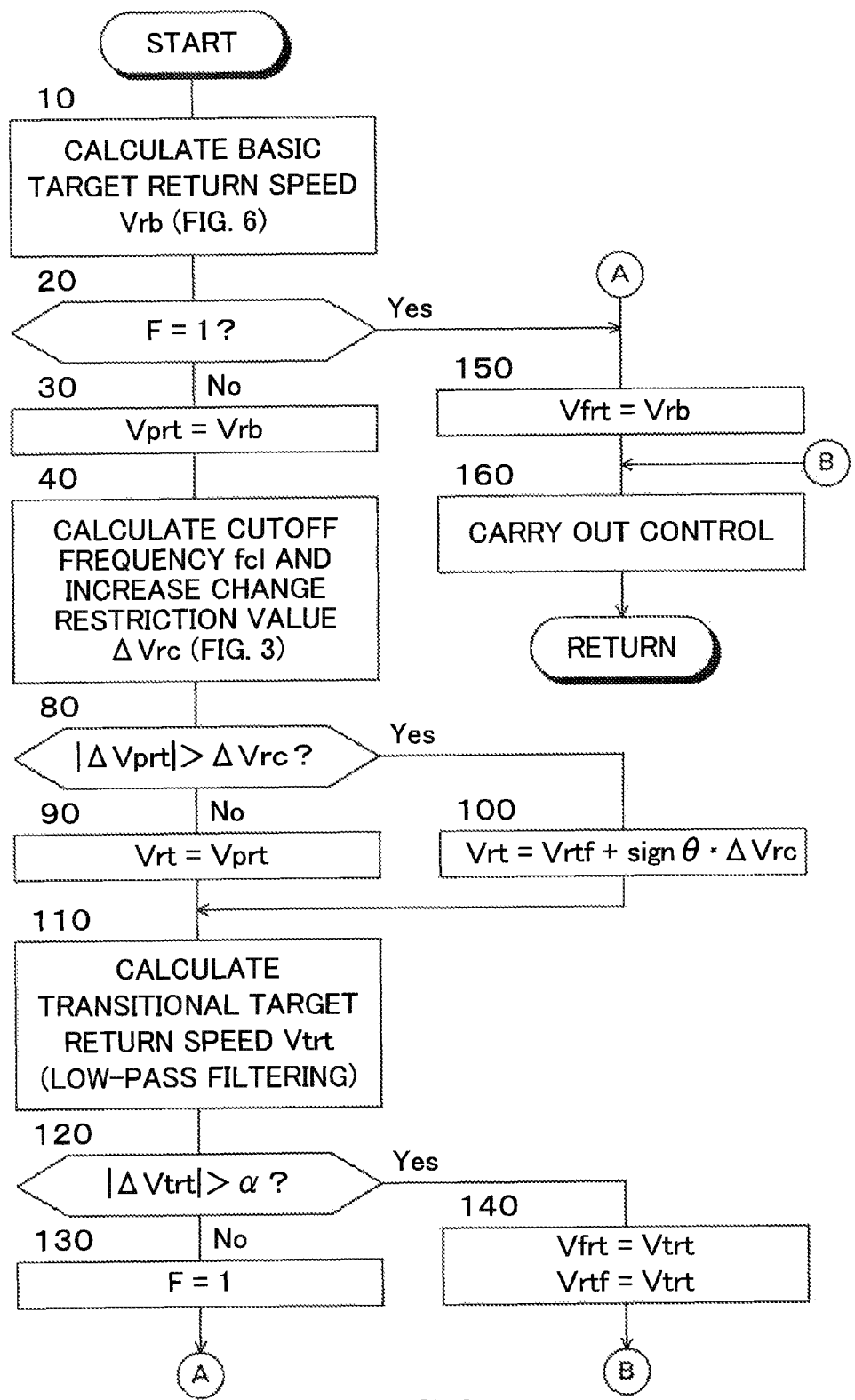
FIG. 2 is a flowchart for illustrating a control routine for a return speed Vr toward a neutral position of a steering wheel according to the first embodiment.
Figure 3:
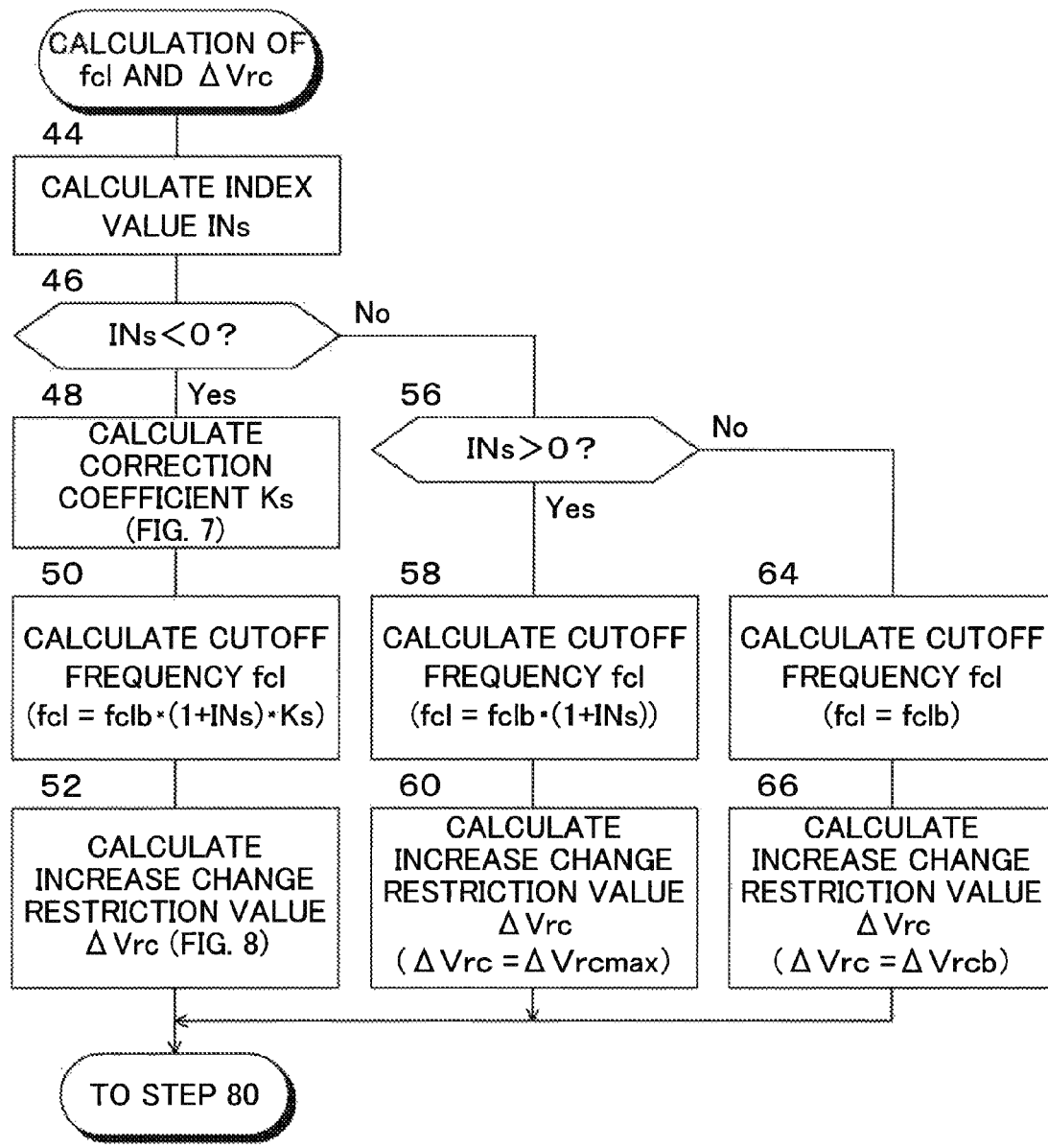
FIG. 3 is a flowchart for illustrating a calculation routine for a cutoff frequency fcl and an increase change restriction value ΔVrc to be executed in Step 40 of FIG. 2.

In contrast, the electronic control device 50 is configured to, under a state in which the steering wheel 14 is being returned toward the neutral position, follow the flowcharts illustrated in FIG. 2 and FIG. 3 to control a return speed Vr of the steering wheel 14 toward the neutral position. In other words, the electronic control device 50 is configured to calculate the basic target return speed Vrb based on the steering angle θ and the vehicle speed V, and calculate a target return speed Vrt for appropriately returning the steering wheel 14 toward the neutral position based on the basic target return speed Vrb. Further, the electronic control device 50 is configured to control the steering assist torque Ta by controlling the power steering unit 46 through feedback control based on the deviation between the actual return speed Vr of the steering wheel 14 and the target return speed Vrt so that the actual return speed Vr reaches the target return speed Vrt.

Referring to the flowcharts illustrated in FIG. 2 and FIG. 3, a description is now given of the control of the return speed Vr of the steering wheel 14 toward the neutral position (hereinafter simply referred to as "control" as necessary) according to the first embodiment. The control in accordance with the flowchart illustrated in FIG. 2 is repeated at predetermined periods under the state in which the steering wheel 14 is being returned toward the neutral position. In the course of the control in accordance with the flowchart illustrated in FIG. 2, when the steering wheel 14 is brought into the incremental steering state or the hold steering state, the control of the steering assist torque transitions to the control of the steering assist torque for the incremental steering or the hold steering.

The determination of whether or not the steering wheel 14 is being returned toward the neutral position is not a part of the present invention, and may be made in any manner. For example, the above-mentioned determination may be made based on any one of or a combination of whether or not the magnitude of the steering torque T is less than a value required for the hold steering, whether or not the signs of the steering angle θ and the steering angular velocity θd are different from each other, whether or not the signs of the steering angle θ and the steering torque T are different from each other, and whether or not the signs of the steering torque T and the steering angular velocity θd are different from each other.

First, in Step 10, through use of the map shown in FIG. 6, the basic target return speed Vrb corresponding to the steering angle θ and the vehicle speed V is calculated. In this case, the basic target return speed Vrb is calculated to be a negative value when the steering angle θ has a positive value, and is calculated to be a positive value when the steering angle θ has a negative value.

In Step 20, it is determined whether or not a flag F is 1, that is, whether or not calculation of a transitional target return speed Vtrt described later is unnecessary and a final target return speed Vfrt is to be set to the basic target return speed Vrb. When an affirmative determination is made, the control proceeds to Step 150. When a negative determination is made, in Step 30, a preliminary target return speed Vprt is set to the basic target return speed Vrb, and then, the control proceeds to Step 40. The flag F is reset to 0 when the control starts, and is also reset to 0 when the steering wheel 14 is brought into the incremental steering state or the hold steering state in the course of the control in accordance with the flowchart illustrated in FIG. 2.

In Step 40, in accordance with the flowchart illustrated in FIG. 3, a cutoff frequency fcl for low-pass filtering in Step 110 described later, and further, an increase change restriction value ΔVrc for restricting the increase amount of the target return speed Vrt are calculated. The calculation of the cutoff frequency fcl and the increase change restriction value ΔVrc carried out in accordance with the flowchart illustrated in FIG. 3 is described later.

In Step 80, it is determined whether or not the absolute value of a deviation ΔVprt between the preliminary target return speed Vprt and a previous target return speed Vrtf is more than the increase change restriction value ΔVrc, that is, whether or not the restriction on the increase amount of the target return speed Vrt is necessary. When a negative determination is made, in Step 90, the target return speed Vrt is set to the preliminary target return speed Vprt. In contrast, when an affirmative determination is made, in Step 100, the target return speed Vrt is set to a sum Vrtf+signθ·ΔVrc of the previous return speed Vrtf and a product signθ·ΔVrc of signθ and the increase change restriction value ΔVrc, where signθ represents the sign of the steering angle θ.

In Step 110, through application of the low-pass filtering to the target return speed Vrt at the cutoff frequency fcl set in Step 40, the transitional target return speed Vtrt is calculated.

In Step 120, it is determined whether or not the absolute value of a deviation ΔVtrt between the basic target return speed Vrb and the transitional target return speed Vtrt is more than a reference value α (positive constant). In other words, it is determined whether or not the return speed control cannot be caused to transition to the control based on the basic target return speed Vrb, and thus the control based on the transitional target return speed Vtrt needs to be continued. When a negative determination is made, in Step 130, the flag F is set to 1, and then, the control proceeds to Step 150. In contrast, when an affirmative determination is made, in Step 140, both of the final target return speed Vfrt and the previous target return speed Vrtf to be used in the next control cycle are set to the transitional target return speed Vtrt, and then, the control proceeds to Step 160.

In Step 150, the return speed control may transition from the control based on the transitional target return speed Vtrt to the control based on the basic target return speed Vrb, and thus the final target return speed Vfrt is set to the basic target return speed Vrb.

In Step 160, the actual return speed Vr is calculated as a time derivative of the steering angle θ, and, based on a deviation between the final target return speed Vfrt and the actual return speed Vr, feedback control is applied to the steering assist torque Ta (assist torque in the return direction) so that the deviation decreases.

Referring to the flowchart illustrated in FIG. 3, a description is now given of the calculations of the cutoff frequency fcl and the increase change restriction value ΔVrc to be carried out in Step 40.

First in Step 44, a time derivative Td of the steering torque T is calculated, and in accordance with Expression (1), an active/passive index value INs is calculated. When INs has a positive value, the steering operation by the driver is an active steering operation, and the driver is actively returning the steering wheel 14 toward the neutral position. When INs is a negative value, the steering operation by the driver is a passive steering operation, and the arms of the driver are moved by the rotation of the steering wheel 14 returning toward the neutral position. When INs is 0, the steering operation of the driver is neither the active steering operation nor the passive steering operation, and a state in which the steering wheel 14 is not rotated is present.

$$INs = \theta d \cdot T + \theta \cdot Td \quad (1)$$

In Step 46, it is determined whether or not the active/passive index value INs of the steering is a negative value, that is, whether or not the steering operation by the driver is the passive steering operation. When a negative determination is made, the control proceeds to Step 56, and when an affirmative determination is made, the control proceeds to Step 48.

Figure 7:
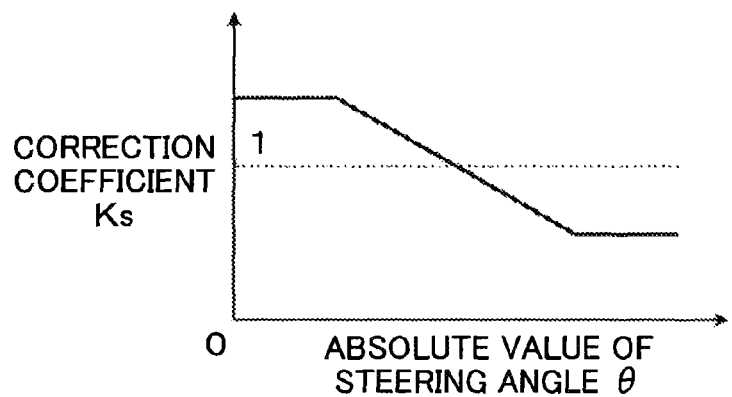
FIG. 7 is a graph for showing a map to be used to calculate a correction coefficient Ks based on the absolute value of the steering angle θ.

In Step 48, based on the absolute value of the steering angle θ, a correction coefficient Ks (positive value) based on the magnitude of the steering angle θ is calculated from the map shown in FIG. 7. As shown in FIG. 7, the correction coefficient Ks is calculated so as to generally decrease as the absolute value of the steering angle θ increases, to be less than 1 in a region where the absolute value of the steering angle θ is large, and to be more than 1 in a region where the absolute value of the steering angle θ is small.

In Step 50, in accordance with Expression (2), the cutoff frequency fcl for the low-pass filtering in Step 110 is calculated. In this expression, fclb is a base value (positive constant) for the cutoff frequency. The active/passive index value INs for the steering is negative, and 1+INs is thus less than 1. Thus, fclb·(1+INs) is less than the base value fclb.

$$fcl = fclb \cdot (1+INs) \cdot Ks \quad (2)$$

Figure 8:
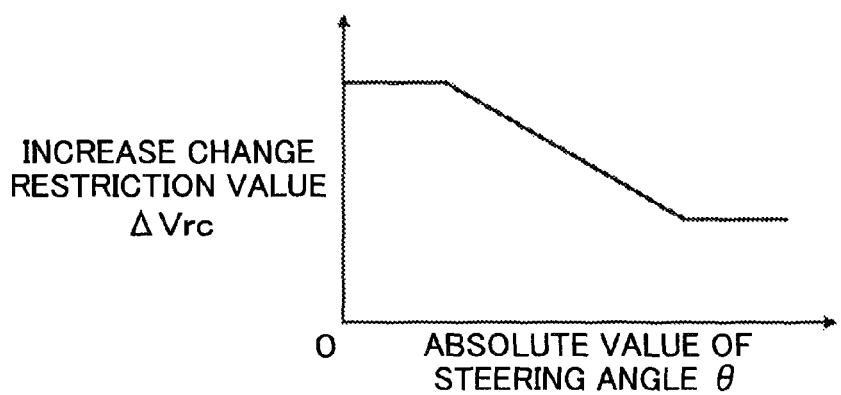
FIG. 8 is a graph for showing a map to be used to calculate the increase change restriction value ΔVrc based on the absolute value of the steering angle θ.

In Step 52, based on the absolute value of the steering angle θ, the increase change restriction value ΔVrc (positive value) is calculated from the map shown in FIG. 8. As shown in FIG. 8, the increase change restriction value ΔVrc is calculated so as to generally decrease as the absolute value of the steering angle θ increases.

In Step 56, it is determined whether or not the active/passive index value INs of the steering is a positive value, that is, whether or not the steering operation by the driver is the active steering operation. When a negative determination is made, the control proceeds to Step 64, and when an affirmative determination is made, the control proceeds to Step 58. Note that, in Step 56, a negative determination is made when the active/passive index value INs of the steering is 0. The active/passive index value INs is calculated in accordance with Expression (1). Thus, even when it is determined that the steering wheel 14 is being returned toward the neutral position, the active/passive index value INs may be 0.

In Step 58, in accordance with Expression (3), the cutoff frequency fcl for the low-pass filtering is calculated. The active/passive index value INs for the steering is positive, and 1+INs is thus more than 1. Thus, fclb·(1+INs) is more than the base value fclb.

$$fcl = fclb \cdot (1+INs) \quad (3)$$

In Step 60, the increase change restriction value ΔVrc is set to the maximum value ΔVrcmax (positive value) set in advance. In this case, the maximum value ΔVrcmax is a value equal to or more than the maximum value of the increase change restriction value ΔVrc shown in FIG. 8.

In Step 64, the cutoff frequency fcl for the low-pass filtering is set to the base value fclb of the cutoff frequency.

In Step 66, the increase change restriction value ΔVrc is set to a base value ΔVrcb (positive value) set in advance. The base value ΔVrcb is between the maximum value and the minimum value of the increase change restriction value ΔVrc shown in FIG. 8.

As appreciated from the description given above, in Step 10, through use of the map shown in FIG. 6, the basic target return speed Vrb corresponding to the steering angle θ and the vehicle speed V is calculated. When the absolute value of the deviation ΔVtrt between the basic target return speed Vrb and the transitional target return speed Vtrt is more than the reference value α, the flag F is 0. Thus, in Step 20, the negative determination is made, and in Step 30 to Step 100, the transitional target return speed Vtrt is calculated. Further, in Step 120, the affirmative determination is made, in Step 140, the final target return speed Vfrt is set to the transitional target return speed Vtrt, and in Step 160, the return speed Vr of the steering wheel 14 is controlled so as to reach the transitional target return speed Vtrt.

In contrast, when the absolute value of the deviation ΔVtrt between the basic target return speed Vrb and the transitional target return speed Vtrt is equal to or less than the reference value α, in Step 120, the negative determination is made, and in Step 130, the flag F is set to 1. Thus, in Step 20, the affirmative determination is made, in Step 150, the final target return speed Vfrt is set to the basic target return speed Vrb, and in Step 160, the return speed Vr of the steering wheel 14 is controlled so as to reach the basic target return speed Vrb.

Figure 9:
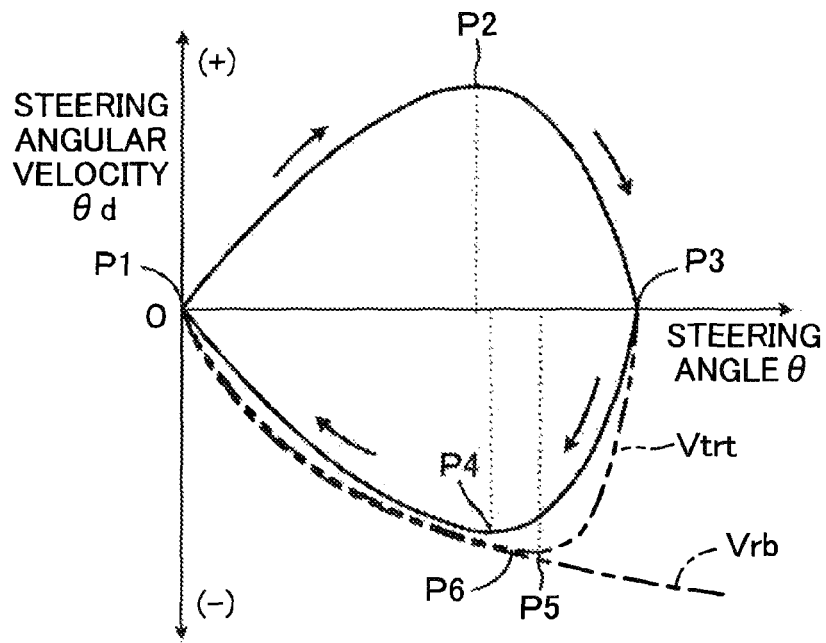
FIG. 9 is a graph for showing a relationship between the steering angle θ and a steering angular velocity θd for an example of a steering operation in which, in a vehicle in which the return speed Vr is not controlled, the steering wheel is incrementally steered from the neutral position, undergoes a hold steering state, and is returned toward the neutral position.

FIG. 9 is a graph for showing an example of a steering operation in which, in a vehicle in which the return speed Vr is not controlled, the steering wheel 14 is incrementally steered from the neutral position, momentarily undergoes the hold steering state, and is returned toward the neutral position. In FIG. 9, a point P1 represents the neutral position, and a point P2 represents a state in which an incremental steering speed is the maximum. A point P3 represents the hold steering state, and a point P4 represents a state in which a return steering speed is the maximum.

Further, in FIG. 9, the long dashed short dashed line represents an ideal return speed when the steering wheel 14 returns toward the neutral position from a position at which the basic target return speed Vrb, namely, the magnitude of the steering angle θ is infinite, and the long dashed double-short dashed line represents the transitional target return speed Vtrt according to the first embodiment. A point P5 represents a state in which the return speed Vr controlled in the first embodiment is the maximum, and a point P6 represents a point at which the calculation of the transitional target return speed Vtrt becomes no longer necessary.

In the first embodiment, when the state in which the steering wheel 14 is being returned toward the neutral position is brought about, the control of the return speed Vr of the steering wheel 14 toward the neutral position carried out in accordance with the flowcharts illustrated in FIG. 2 and FIG. 3 is started. Thus, the return speed Vr from the point P3 to the point P1 is controlled as represented by the long dashed double-short dashed line according to the first embodiment. In particular, the return speed Vr is controlled to reach the transitional target return speed Vtrt from the point P3 to the point P6, and is controlled to reach the basic target return speed Vrb from the point P6 to the point P1.

According to the first embodiment, the steering assist torque is controlled so as to promote the return of the steering wheel 14 toward the neutral position. Thus, compared with a vehicle in which the return speed is not controlled, the magnitude of the return speed Vr after the state in which the steering wheel 14 is being returned toward the neutral position is brought about can be increased. Thus, for example, even under a state in which the self-aligning torque acting on the steered wheels is small such as a state in which a vehicle is turning at a low speed, the steering wheel 14 can efficiently be returned to the neutral position.

Moreover, as shown in FIG. 9, the magnitude of the transitional target return speed Vtrt gradually increases substantially from 0 so as to gradually approach the basic target return speed Vrb as the magnitude of the steering angle θ decreases from the point P3 to the point P6.

Thus, compared with a target value of the return speed Vr (hereinafter referred to as "target value of comparative example") calculated by applying low-pass filtering to the basic target return speed Vrb, the increase rate of the magnitude of the transitional target return speed Vtrt can be reduced. Thus, according to the first embodiment, compared with the comparative example, it is possible to reduce such a fear that, at the beginning of the return speed control, the return speed Vr rapidly increases, the steering wheel 14 rotates excessively fast, and consequently, occupants of the vehicle feel a sense of discomfort.

Figure 10:
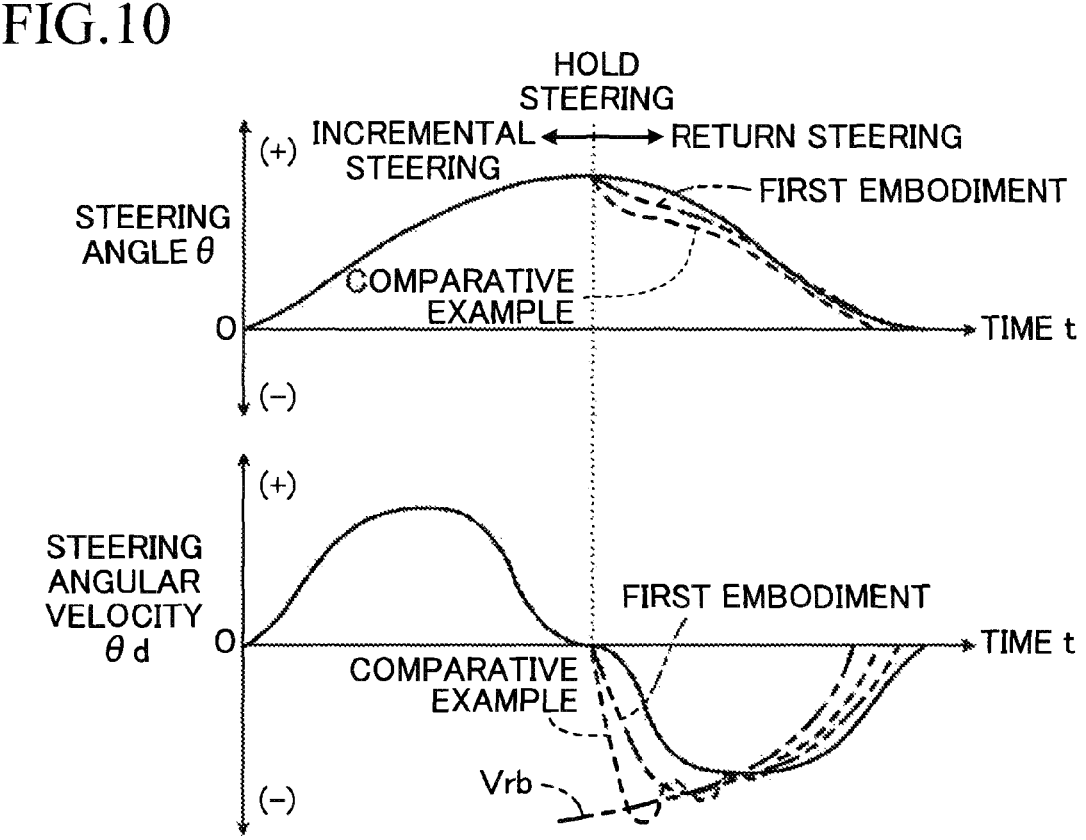
FIG. 10 is a graph for showing changes in the steering angle θ (top row) and the steering angular velocity θd (bottom row) for the example in which the steering wheel is incrementally steered from the neutral position, undergoes the hold steering state, and is returned toward the neutral position.

For example, FIG. 10 is a graph for showing changes in the steering angle θ (top row) and the steering angular velocity θd (bottom row) for the example in which the steering wheel 14 is incrementally steered from the neutral position, undergoes the hold steering state, and is returned toward the neutral position. In FIG. 10, the solid line represents the example in which the return speed is not controlled, and the long dashed short dashed line represents the basic target return speed Vrb. The long dashed double-short dashed line represents the case of the first embodiment, and the broken line represents the case of the comparative example.

In the case of the comparative example, when the state in which the steering wheel 14 is returned toward the neutral position is brought about, the target value of the return speed Vr is set to the value acquired by applying the low-pass filtering to the basic target return speed Vrb, and thus the magnitude of the return speed Vr rapidly increases. Therefore, at least at the beginning of the state in which the steering wheel 14 is being returned toward the neutral position, the steering wheel 14 rotates toward the neutral position excessively fast, and the magnitude of the steering angle θ rapidly decreases.

Moreover, the magnitude of the target value of the return speed Vr rapidly increases, and thus the steering assist torque for returning the steering wheel 14 toward the neutral position tends to be excessive. Therefore, hunting is often caused in which the state of the magnitude of the return speed Vr being more than the basic target return speed Vrb and the state of the magnitude of the return speed Vr being less than the basic target return speed Vrb are alternately repeated, and the rotation speed of the steering wheel 14 to return toward the neutral position unnecessarily increases/decreases.

In order to avoid the occurrence of the above-mentioned problem, as the electric power steering device disclosed in Japanese Patent Application Laid-open No. Sho 62-241768, it is conceivable to set, when the magnitude of the deviation of the return speed is large, a gain of the feedback control for the steering assist torque based on the deviation of the return speed to a small value. Alternatively, it is conceivable to set the cutoff frequency of the low-pass filtering to a small value.

However, when the gain of the feedback control is set to a small value, the magnitude of the steering assist torque for promoting the return of the steering wheel 14 toward the neutral position is restricted. On the other hand, when the cutoff frequency of the low-pass filtering is set to a small value, the increase rate of the target value of the return speed Vr is restricted. Thus, in any of the above-mentioned countermeasures, the timing of the target value of the return speed Vr to substantially reach the basic target return speed Vrb is excessively delayed, and as a result, an excessive delay of the timing at which the steering wheel 14 returns toward the neutral position cannot be avoided.

In contrast, according to the first embodiment, in Step 80 to Step 100, the increase amount of the magnitude of the target return speed Vrt for each control cycle is restricted to a value equal to or less than the increase change restriction value ΔVrc, and thus the magnitude of the transitional target return speed Vtrt gradually increases. Further, in Step 110, the transitional target return speed Vtrt, which is the target value of the return speed Vr, is calculated by applying the low-pass filtering to the target return speed Vrt, and thus a change rate of the magnitude of the transitional target return speed Vtrt decreases, and approaches a change rate of the basic target return speed Vrb. Thus, such a fear that, at the beginning of the return speed control, the magnitude and the change rate of the steering assist torque excessively increase can be reduced. Thus, the fear for the hunting of the magnitude of the return speed Vr with respect to the magnitude of the basic target return speed Vrb can be reduced, and the fear for the unnecessary increase/decrease in the rotational speed of the steering wheel 14 can be reduced.

Moreover, the magnitude of the target return speed Vrt to which the low-pass filtering is applied so as to calculate the transitional target return speed Vtrt is prevented from excessively increasing, and thus the cutoff frequency of the low-pass filtering does not need to be set to an excessively small value. Thus, the timing at which the transitional target return speed Vtrt substantially reaches the basic target return speed Vrb can be prevented from being excessively delayed, and the timing at which the steering wheel 14 is returned to the neutral position can be prevented from being excessively delayed.

Figure 11:
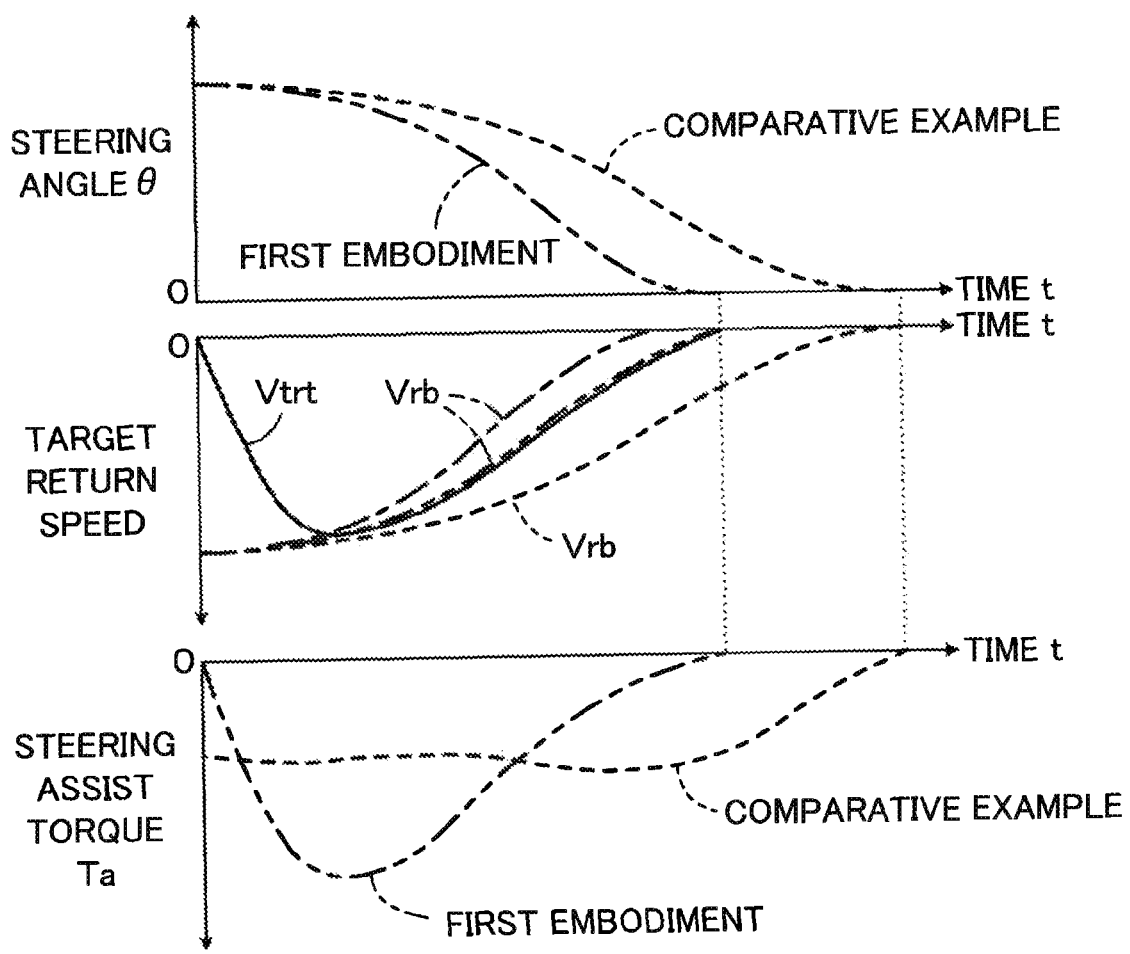
FIG. 11 is a graph for showing an example of changes in the steering angle θ (top row), the target return speed (middle row), and a steering assist torque (bottom row) for showing a comparison in actions and effects of the first embodiment with the electric power steering device disclosed in Japanese Patent Application Laid-open No. Sho 62-241768.

FIG. 11 is a graph for showing an example of changes in the steering angle θ (top row), the target return speed (middle row), and the steering assist torque Ta (bottom row) for describing a comparison in actions and effects of the first embodiment with the electric power steering device disclosed in Japanese Patent Application Laid-open No. Sho 62-241768.

At the beginning of the return speed control for the steering wheel 14, the magnitude of the deviation between the basic target return speed Vrb represented by the long dashed short dashed line and the actual return speed Vr, which is not shown in FIG. 11, is large. Thus, in the case of the electric power steering device disclosed in Japanese Patent Application Laid-open No. Sho 62-241768, the gain of the feedback control is set to a small value, and thus as represented by the broken line in the bottom row, the magnitude of the steering assist torque Ta is a small value. Thus, the magnitude of the actual return speed Vr does not sufficiently increase, and as represented by the broken line in the top row, a decrease speed of the magnitude of the steering angle θ is small.

Therefore, as represented by the broken line in the middle row, the change in the basic target return speed Vrb with respect to the elapsed time is slow, and the state in which the magnitude of the deviation of the return speed is large continues for a long period. Thus, the state in which the gain of the feedback control is set to a small value also continues for a long period. As a result, as represented by the broken line in the top row, a significantly long period is necessary until the steering wheel 14 returns to the neutral position and the steering angle θ becomes 0.

In contrast, according to the first embodiment, when the return speed control starts, as represented by the solid line in the middle row, the transitional target return speed Vtrt gradually approaches the basic target return speed Vrb represented by the long dashed short dashed line. When the transitional target return speed Vtrt reaches the basic target return speed Vrb, the transitional target return speed Vtrt changes in accordance with the basic target return speed Vrb. Thus, as represented by the long dashed double-short dashed line in the bottom row, the magnitude of the steering assist torque Ta gradually increases, and as represented by the long dashed double-short dashed line in the top row, the decrease speed of the magnitude of the steering angle θ is faster than that in the case of the electric power steering device disclosed in Japanese Patent Application Laid-open No. Sho 62-241768. Thus, the magnitude of the actual return speed Vr sufficiently increases, and the steering wheel 14 returns to the neutral position faster than that in the case of the electric power steering device disclosed in Japanese Patent Application Laid-open No. Sho 62-241768.

Moreover, according to the first embodiment, in Step 44, the active/passive index value INs for the steering is calculated, and in Step 46, it is determined whether or not the active/passive index value INs for the steering is a negative value, that is, whether or not the steering operation by the driver is the passive steering operation. When the steering operation by the driver is the passive steering operation, in Step 50, the cutoff frequency fcl for the low-pass filtering is calculated to be a value smaller than the base value fclb. In contrast, when the steering operation by the driver is an active steering operation, in Step 56, an affirmative determination is made, and in Step 58, the cutoff frequency fcl is calculated to be a value larger than the base value fclb.

Figure 12:
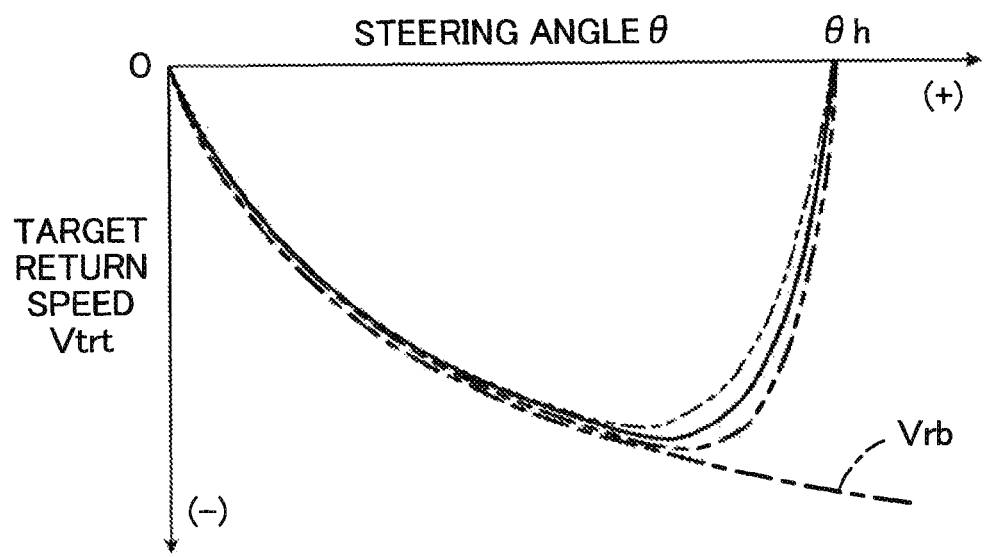
FIG. 12 is a graph for showing a difference in an increase rate of the magnitude of a transitional target return speed Vtrt depending on whether or not a steering operation of a driver is a passive steering operation according to the first embodiment.

FIG. 12 is a graph for showing a difference in the increase rate of the magnitude of the transitional target return speed Vtrt depending on whether or not the steering operation by the driver is the passive steering operation, and θh is a steering angle when the steering wheel 14 starts returning to the neutral position. In FIG. 12, the solid line represents a case in which the steering operation by the driver is neither the passive steering operation nor the active steering operation. The thin long dashed double-short dashed line and the thick long dashed double-short dashed line respectively represent the case in which the steering operation is the passive steering operation, and the case in which the steering operation is the active steering operation.

When the steering operation by the driver is the passive steering operation, the driver does not actively try to return the steering wheel 14 to the neutral position. When the steering operation by the driver is the passive steering operation, as represented by the thin long dashed double-short dashed line of FIG. 12, the increase rate of the magnitude of the transitional target return speed Vtrt can be a moderate value similarly to the case of a vehicle in which the return speed is not controlled. Thus, the steering wheel 14 can be prevented from returning toward the neutral position excessively fast, and the driver can easily carry out correction steering when the driver feels that the correction steering is necessary.

In contrast, when the steering operation by the driver is the active steering operation, the driver is actively trying to return the steering wheel 14 to the neutral position. When the steering operation by the driver is the active steering operation, as represented by the thick long dashed double-short dashed line of FIG. 12, the increase rate of the magnitude of the transitional target return speed Vtrt can be a large value. Thus, the steering assist torque Ta for prompting the return of the steering wheel 14 toward the neutral position can be quickly increased, and the intention of the driver of quickly returning the steering wheel 14 to the neutral position can be effectively satisfied.

In particular, according to the first embodiment, when the steering operation by the driver is the passive steering operation, in Step 50, the cutoff frequency fcl of the low-pass filtering is calculated as the product of fclb·(1+INs) and the correction coefficient Ks. In Step 48, the correction coefficient Ks is calculated so as to decrease as the absolute value of the steering angle θ increases. Thus, on a stage on which the steering wheel 14 starts returning toward the neutral position, the absolute value of the steering wheel θ is large, and thus the cutoff frequency fcl can be increased, to thereby increase the increase rate of the magnitude of the transitional target return speed Vtrt.

Moreover, as the control of the return speed progresses, and the absolute value of the steering angle θ decreases, the correction coefficient Ks gradually increases accordingly. Thus, as the control of the return speed progresses, and the absolute value of the steering angle θ decreases, the cutoff frequency fcl can be gradually increased, and this can also gradually increase the increase rate of the magnitude of the transitional target return speed Vtrt.

Further, according to the first embodiment, in Step 52, the increase change restriction value ΔVrc is calculated so as to decrease as the absolute value of the steering angle θ increases. In Step 80 to Step 100, the increase amount of the magnitude of the target return speed Vrt for each control cycle is restricted to be equal to or less than the increase change restriction value ΔVrc. Thus, when the magnitude of the steering angle θ is small, and the magnitude of the self-aligning torque acting on the steered wheels is thus small, the increase rate of the magnitude of the transitional target return speed Vtrt can be increased, thereby effectively promoting the return of the steering wheel 14 toward the neutral position. Conversely, when the magnitude of the steering angle θ is large, and the magnitude of the self-aligning torque acting on the steered wheels is thus large, the increase rate of the magnitude of the transitional target return speed Vtrt can be decreased, thereby decreasing the fear for the excessive increase in the steering assist torque Ta.

Second Embodiment

Figure 4:
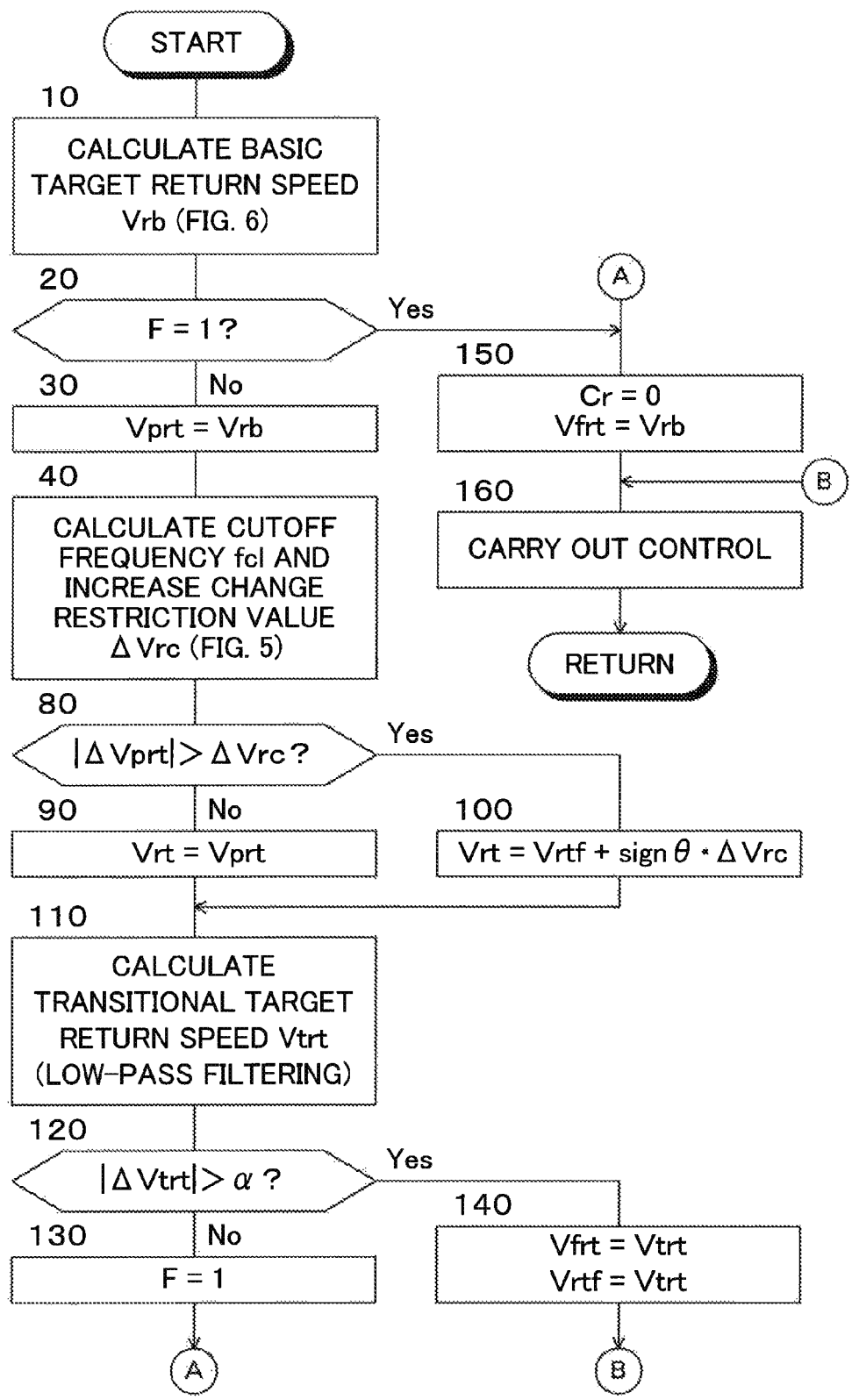
FIG. 4 is a flowchart for illustrating a control routine for the return speed Vr toward the neutral position of the steering wheel in an electric power steering device according to a second embodiment of the present invention.

FIG. 4 is a flowchart for illustrating a control routine for the return speed Vr toward the neutral position of the steering wheel 14 in the electric power steering device 10 according to a second embodiment of the present invention. In FIG. 4, the same step as the step illustrated in FIG. 2 is denoted by the same step number as that assigned in FIG. 2.

As appreciated from a comparison between FIG. 4 and FIG. 2, in the second embodiment, steps other than Step 40 and Step 150 are carried out as in the first embodiment. In Step 40, the cutoff frequency fcl and the increase change restriction value ΔVrc are calculated in accordance with a flowchart illustrated in FIG. 5 in place of the flowchart illustrated in FIG. 3.

In Step 150, the final target return speed Vfrt is set to the basic target return speed Vrb, and further, a count Cr representing the number of times of the negative determination in Step 20, namely, the number of times of the setting of the final target return speed Vfrt to the transitional target return speed Vtrt is reset to 0. The count Cr is reset to 0 when the control starts, and is also reset to 0 when the steering wheel 14 is brought into the incremental steering state or the hold steering state in the course of the control in accordance with the flowchart illustrated in FIG. 4.

Figure 5:
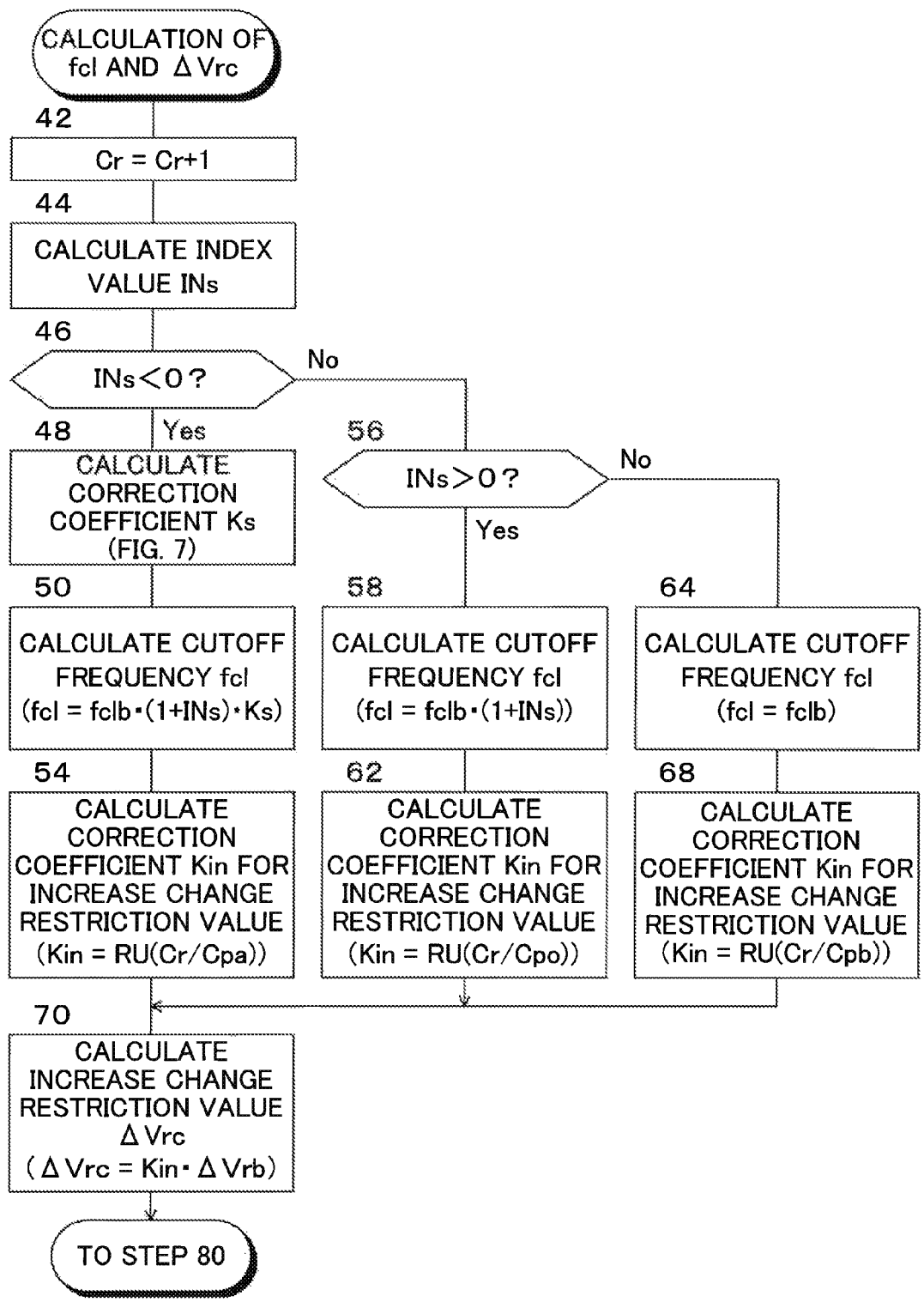
FIG. 5 is a flowchart for illustrating a calculation routine for the cutoff frequency fcl and the increase change restriction value ΔVrc to be executed in Step 40 of FIG. 4.

Referring to the flowchart illustrated in FIG. 5, a description is now given of the calculations of the cutoff frequency fcl and the increase change restriction value ΔVrc to be carried out in Step 40.

As appreciated from the comparison between FIG. 5 and FIG. 3, in the second embodiment, Step 42 is carried out before Step 44, and in Step 42, the count Cr is incremented by 1.

Step 46 to Step 50 are carried out in the same way as in the first embodiment, and in Step 54, which is carried out next to Step 50, a correction coefficient Kin (positive integer) for the increase change restriction value ΔVrc is calculated in accordance with Expression (4). In Expression (4), Cpa is a constant integer set in advance and more than 3. A function RU in Expression (4) and Expression (5) is a function of rounding up a decimal in the parenthesis to an integer.

$$Kin=RU(Cr/Cpa) \quad (4)$$

Step 56 and Step 58 are carried out in the same way as in the first embodiment, and in Step 62, which is carried out next to Step 58, the correction coefficient Kin is calculated in accordance with Expression (5). In Expression (5), Cpo is a positive constant integer set in advance, and is smaller than Cpa. Thus, for the same Cr, the correction coefficient Kin calculated in Step 62 is larger than the correction coefficient Kin calculated in Step 54.

$$Kin=RU(Cr/Cpo) \quad (5)$$

Step 64 is carried out in the same way as in the first embodiment, and in Step 68, which is carried out next to Step 64, the correction coefficient Kin is calculated in accordance with Expression (6). In Expression (6), Cpb is a positive constant integer set in advance, which is larger than Cpo and smaller than Cpa. Thus, for the same Cr, the correction coefficient Kin calculated in Step 64 is larger than the correction coefficient Kin calculated in Step 54 and smaller than the correction coefficient Kin calculated in Step 62.

$$Kin=RU(Cr/Cpb) \quad (6)$$

When any one of Step 54, Step 62, and Step 68 is finished, the control proceeds to Step 70. In Step 70, the increase change restriction value ΔVrc is calculated as a product of the correction coefficient Kin and the base value Vrcb (positive integer) set in advance.

As appreciated from the description given above, according to the second embodiment, steps other than Steps 42, 54, 62, 68, 70, and 150 are carried out in the same way as in the first embodiment. In particular, Steps 54, 62, 68, and 70 are carried out in place of Steps 52, 60, and 66 of the first embodiment. Thus, the actions and effects other than the actions and effects provided in Steps 52, 60, and 66 can also be provided in the second embodiment.

Figure 13:
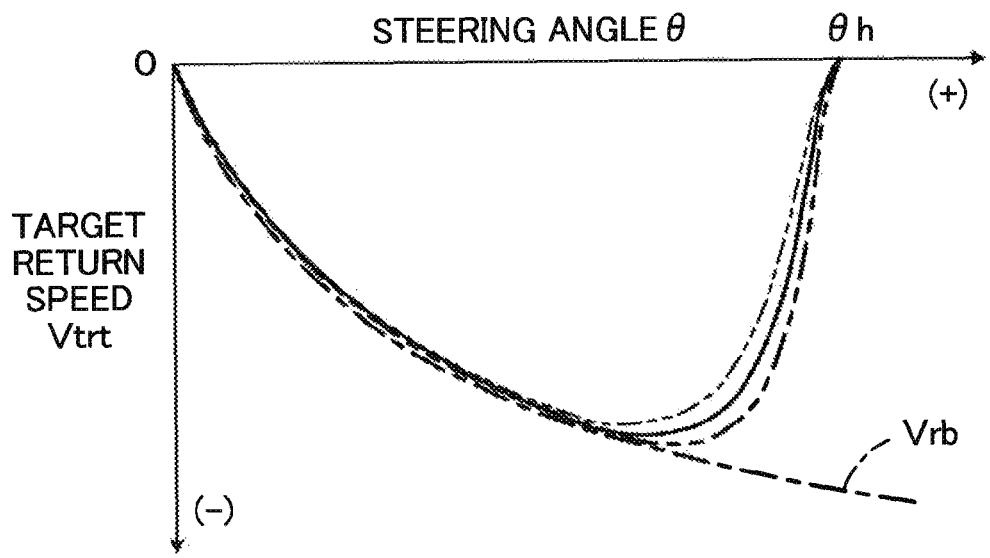
FIG. 13 is a graph for showing a difference in an increase rate of the magnitude of the transitional target return speed Vtrt depending on whether or not the steering operation of the driver is a passive steering operation according to the second embodiment.

As described before, in Steps 42, 54, 62, and 68, the correction coefficient Kin used to calculate the increase change restriction value ΔVrc in Step 70 is calculated so as to increase stepwise as the control of the return speed progresses. Thus, the magnitude of the increase change restriction value ΔVrc also increases stepwise as the control of the return speed progresses. Thus, as shown in FIG. 13, compared with the first embodiment, a ratio of the increase amount of the transitional target return speed Vtrt to the decrease amount of the magnitude of the steering angle θ can be decreased, thereby moderating the increase rate of the transitional target return speed Vtrt at the beginning of the return speed control.

Moreover, in Steps 54, 62, and 68, the correction coefficient Kin is variably set depending on the determination results in Steps 46 and 56. In particular, the correction coefficient Kin is calculated to be a small value in the case in which the steering operation by the driver is the passive steering operation compared with the case in which the steering operation by the driver is the active steering operation. Thus, when the steering operation by the driver is the passive steering operation, and the driver is not actively trying to return the steering wheel 14 to the neutral position, the increase rate of the magnitude of the transitional target return speed Vtrt can be a moderate value. Thus, the steering wheel 14 can be prevented from returning toward the neutral position excessively fast.

In contrast, when the steering operation by the driver is the active steering operation, and the driver is actively trying to return the steering wheel 14 to the neutral position, the increase rate of the magnitude of the transitional target return speed Vtrt can be a large value. Thus, the magnitude of the steering assist torque Ta for prompting the return of the steering wheel 14 toward the neutral position can be quickly increased, thereby effectively satisfying the intention of the driver of quickly returning the steering wheel 14 to the neutral position.

Moreover, the correction coefficient Kin increases stepwise as the control of the return speed progresses, but the increase rate when the steering operation by the driver is the active steering operation is larger than the increase rate when the steering operation by the driver is the passive steering operation. Thus, when the steering operation by the driver is the passive steering operation, the transitional target return speed Vtrt is prevented from reaching the basic target return speed Vrb excessively fast. Conversely, when the steering operation by the driver is the active steering operation, the transitional target return speed Vtrt is prevented from reaching the basic target return speed Vrb excessively slowly.

Further, according to the second embodiment, the increase rate of the magnitude of the transitional target return speed Vtrt at the beginning of the control of the return speed can be moderated compared with the first embodiment. Thus, even when the cutoff frequency fcl for the low-pass filtering is controlled to be a large value compared with the first embodiment, the fear for the excessive increase in the magnitude of the steering assist torque Ta for returning the steering wheel 14 toward the neutral position at the beginning of the return speed control can be reduced. Thus, compared with the first embodiment, the cutoff frequency fcl can be set to a large value, and thus a fear for an excessive delay of the transitional target return speed Vtrt reaching the basic target return speed Vrb due to the low-pass filtering can be reduced.

The specific embodiments of the present invention are described in detail above. However, the present invention is not limited to the above-mentioned embodiments. It is apparent for those skilled in the art that various other embodiments may be employed within the scope of the present invention.

For example, in the first and second embodiments, in Step 48, based on the absolute value of the steering angle θ, the correction coefficient Ks is calculated, and in Step 50, the cutoff frequency fcl for the low-pass filtering is calculated in accordance with Expression (2) including the correction coefficient Ks. However, such a correction may be made that the calculation of the correction coefficient Ks in Step 48 is omitted, and in Step 50, the cutoff frequency flc for the low-pass filtering is calculated as fclb·(1+INs).

Moreover, in the first and second embodiments, in Steps 46 and 56, when the negative determination is made, that is, when the steering operation by the driver is determined to be neither the active steering operation nor the passive steering operation, the control proceeds to Step 64. However, in the first embodiment, Steps 56, 64, and 66 may be omitted, and in the second embodiment, Steps 56, 64, and 68 may be omitted. In other words, such a correction may be made that, in Step 46, when the negative determination is made, that is, when the steering operation by the driver is determined not to be the passive steering operation, the control proceeds to Step 58.

Alternatively, in the first embodiment, such a correction may be made that, Steps 46, 64, and 66 are omitted, and when Step 44 is completed, the control proceeds to Step 56, and when the negative determination is made in Step 56, the control proceeds to Step 48. Similarly, in the second embodiment, such a correction may be made that, Steps 46, 64, and 68 are omitted, and when Step 44 is completed, the control proceeds to Step 56, and when the negative determination is made in Step 56, the control proceeds to Step 48.

Moreover, in the second embodiment, as in the first embodiment, in Steps 50, 58, and 64, the cutoff frequency fcl for the low-pass filtering is variably set depending on the steering operation state of the driver. However, such a correction may be made that Steps 48, 50, 58, and 64 are omitted, and the cutoff frequency fcl is set to a constant value independently of the steering operation state of the driver.

Moreover, in the second embodiment, in Steps 54, 62, and 68, the correction coefficient Kin for the increase change restriction value ΔVrc is calculated to be a positive integer. However, the correction coefficient Kin may not be an integer, and for example, such a correction may be made that, in Steps 54, 62, and 68, the correction coefficients Kin are updated respectively to Cr/Cpa, Cr/Cpo, and Cr/Cpb in the respective Cpa cycle, Cpo cycle, and Cpb cycle.

Moreover, in the second embodiment, when the negative determination is made in Steps 46 and 56, in Step 68, the correction coefficient Kin is calculated in accordance with Expression (6). However, the correction coefficient Kin may be set to a predetermined positive constant such as 1.

Moreover, in the first and second embodiments, as shown in FIG. 6, the basic target return speed Vrb is the function of the steering angle θ and the vehicle speed V. However, the basic target return speed Vrb may be a function of only the steering angle θ.

What is claimed is:

1. An electric power steering device, comprising:
a steering assist torque applying device; and
a control device configured to control a steering assist torque to be applied by the steering assist torque applying device to a steering apparatus for a vehicle, wherein:
the control device comprises a storage device configured to store a relationship between a basic target return speed, which increases in magnitude as a magnitude of a steering angle increases, and the steering angle, and is configured to calculate, when a steering wheel is being returned toward a neutral position, the basic target return speed based on an actual steering angle and the relationship, and to apply feedback control to the steering assist torque so that a return speed of the steering wheel reaches the calculated basic target return speed; and
the control device is configured to calculate, when the steering wheel is being returned toward the neutral position, a transitional target return speed, which gradually increases in magnitude and gradually approaches the basic target return speed as a magnitude of the actual steering angle decreases, and to apply, when a magnitude of a difference between the basic target return speed and the transitional target return speed is more than a reference value, feedback control to the steering assist torque so that the return speed of the steering wheel reaches the transitional target return speed in place of the calculated basic target return speed.

2. An electric power steering device according to claim 1, wherein the control device is configured to determine whether or not the steering wheel is being returned toward the neutral position by an active return steering by a driver, and to calculate, in a case in which the steering wheel is being returned toward the neutral position by the active return steering by the driver, the transitional target return speed so that the magnitude of the transitional target return speed increases compared with a case in which the steering wheel is being returned toward the neutral position not by the active return steering by the driver.

3. An electric power steering device according to claim 1, wherein the control device is configured to:
set, at predetermined periods, the calculated basic target return speed to a preliminary target return speed;
set, when a magnitude of a difference between the preliminary target return speed and a previous target return speed is more than an increase restriction value, a current target return speed so that a magnitude of the current target return speed is a sum of a magnitude of the previous target return speed and the increase restriction value;
set, when the magnitude of the difference between the preliminary target return speed and the previous target return speed is not more than the increase restriction value, the current target return speed to the preliminary target return speed; and
apply low-pass filtering to the current target return speed to calculate the transitional target return speed.

4. An electric power steering device according to claim 3, wherein the control device is configured to determine whether or not the steering wheel is being returned toward the neutral position by an active return steering by a driver, and to increase, in a case in which the steering wheel is being returned toward the neutral position by the active return steering by the driver, a cutoff frequency for carrying out the low-pass filtering compared with a case in which the steering wheel is being returned toward the neutral position not by the active return steering by the driver.

5. An electric power steering device according to claim 3, wherein the control device is configured to increase, in a case in which the magnitude of the actual steering angle is small, the increase restriction value compared with a case in which the magnitude of the actual steering angle is large.

6. An electric power steering device according to claim 3, wherein the control device is configured to determine whether or not the steering wheel is being returned toward the neutral position by an active return steering by a driver, and to increase, in a case in which the steering wheel is being returned toward the neutral position by the active return steering by the driver, the increase restriction value compared with a case in which the steering wheel is being returned toward the neutral position not by the active return steering by the driver.

* * * * *